April 17, 1951 J. W. McPHEE 2,549,109
RADIOACTIVE LOCATING MEANS
Filed March 19, 1949
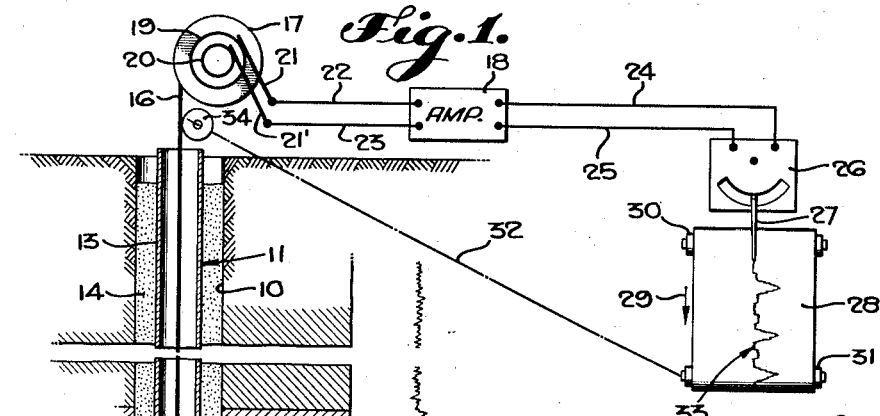
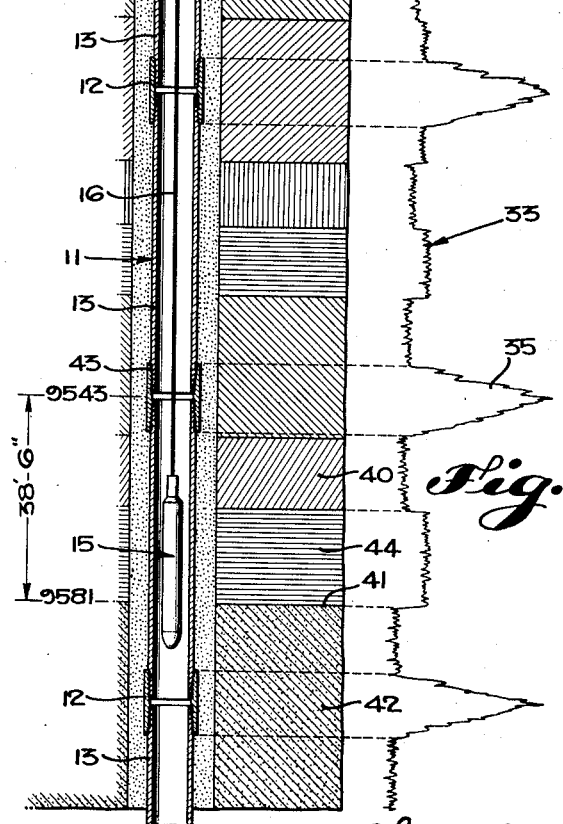
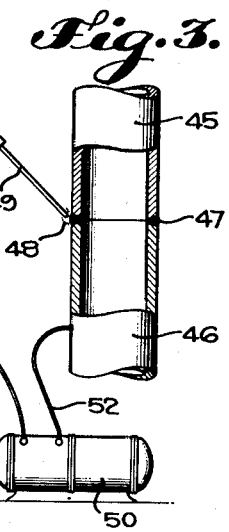
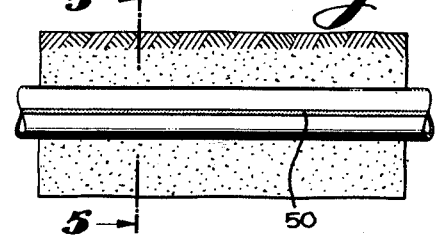
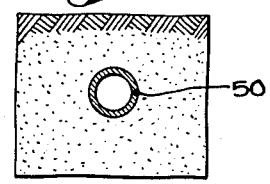
JAMES W. McPHEE,
INVENTOR.
BY Lyle Dillon
ATTORNEY Patented Apr. 17, 1951

2,549,109

UNITED STATES PATENT OFFICE 2,549,109

RADIOACTIVE LOCATING MEANS

James W. McPhee, Los Angeles, Calif., assignor to Lane-Wells Company, Los Angeles, Calif., a corporation of Delaware Application March 19, 1949, Serial No. 82,305

1 Claim. (Cl. 250—83.6)

This invention relates broadly to the location of hidden objects and more particularly to radioactivity-logging of cased well boreholes, including improvements in methods and apparatus for establishing radioactive markers positioned along the length of a well borehole casing to be employed as permanent reference points from which measurements may be made for determining and reestablishing the precise location in depth of certain subterranean strata.

Modern oil well completion and production techniques usually comprise cementing a suitable string of casing in the well borehole after completion of the drilling, followed by the running of a survey instrument on a cable throughout the length of the casing in the well, said instrument being any one of the well known types capable of recording the relative radioactivity of the superposed formation strata traversed by the well borehole, correlated with depth. From a radioactivity log thus obtained, the location within the well borehole of producing formations from which it may be desired to produce oil is determined, and then a perforator, usually of the gun type, is lowered through the casing to a position opposite this formation and the casing and surrounding cement there perforated to admit oil from the producing formation into the well casing. All of these operations, in order to be consistently successful, are dependent upon the accuracy with which the several measurements of depth of both the well logging instrument and the perforator can be made. These measurements can usually be made with sufficient accuracy in shallow wells. However, in present day wells which frequently have depths in the order of 9000 to 18,000 feet, the total elasticity of the cables upon which the well survey instruments and the perforators are lowered and suspended within the well borehole is so great, the variation in tension on these conductor cables which may occur under different frictional and flotation conditions is so wide and the contraction and expansion which may take place due to different temperatures encountered within the well is such as to make it extremely difficult to measure these depths with the required degree of accuracy and consistency. In cases where the deep oil producing horizons are relatively thin and particularly where they are adjacent to or interspersed with water sands, it is necessary that these well survey depths and points of perforation be determined with a high degree of accuracy, otherwise the perforations may enter water or barren sands instead of the desired oil producing formations and as a result of this, the well may be wet or dry instead of the oil producer which it otherwise could have been, and if the error causing such difficulty is eventually discovered, at least an expensive corrective repair operation may be necessary.

In striving to obviate these difficulties hereinbefore mentioned, it has become customary by some in the industry to establish radioactive markers of various types along the length of the well borehole which may be easily and positively detected by means of a radioactivity well survey instrument lowered through the well borehole and which may be employed as check points or reference markers from which the penetrated formations concerned may be accurately established by relatively short differential measurement determinations at the well surface. Such methods are disclosed, for example, in the patents to Ennis 2,228,623 and Russell 2,320,890.

One system for the establishment of such radioactive markers heretofore employed has been that of either applying a radioactive paint-like material or coating to a casing unit or the placing of a small quantity of radioactive material within a closed recess or cavity within a casing unit, then setting the casing within the well borehole and establishing the position of such radioactive casing unit relative to adjacent penetrated formations by means of an instrument lowered through the well borehole, capable of measuring the intensity of radiations from adjacent radioactive material, and forming therefrom a log correlating the positions of the formations and marker points.

Another method of establishing marker points has been that of shooting radioactive bullets into the adjacent formations, prior to setting casing, at known depths within the well borehole by means of a gun perforator and then later, after setting casing, employing the radioactive bullets as marker points which may be detected and located by means of a radioactivity well survey instrument lowered through the cased borehole.

All of these systems for establishing radioactive marker points as hereinbefore mentioned have certain serious disadvantages and defects. For example, in the case of the application of radioactive paint or coating material, the lowering of the casing into the well preparatory to cementing and the cementing process itself or the circulation of cement or other fluid therethrough may abrade the radioactive paint material from the casing unit, resulting in loss of the marker and also the undesirable contamination of the adjacent formations and the introduced cement, with the radioactive paint material thus removed from the casing unit. In the case where the marker is formed by a small quantity of radioactive material contained within a recess or cavity in the casing unit, in event of serious abrasion or more usually in the event of corrosion, the whole quantity of radioactive material thus placed in the cavity of the casing unit may be suddenly released within the well, resulting in serious contamination of the adjacent formations or by its apparent lateral movement within the well, give a false indication of its location which can be more serious in its consequences than a total loss of the marker. Such release of radioactive material within the well can result in sufficient contamination of the formations along a considerable length of the well to render subsequent surveys difficult or impossible due to the relatively weak radioactivity differences of the penetrated formations being masked by the relatively strong radioactivity of the released contaminating material.

Another disadvantage of establishing a radioactive marker by the method of shooting a radioactive bullet into the formations adjacent the well borehole is that the radioactive marker thus established is usually positioned within the formation at a relatively great distance laterally from the axis of the borehole and thus upon subsequently performing a radioactivity survey operation, the radioactivity originating in the radioactive bullet is detected by the instrument over a relatively great length of the borehole. The indicated position of the radio-active bullet marker is thus relatively broad and its exact axial elevation with respect to the well borehole is often indeterminate. Furthermore, it has been found that the radioactive bullet does not always remain in a fixed position but sometimes moves longitudinally with respect to the well borehole either through the penetrated and more or less shattered formation in case it is relatively loose or falls through voids remaining in the annular space between the outside of the well casing and the inside wall of the borehole. In cases where cementing operations are later performed such radioactive bullets have been found to have been dislodged and carried along the borehole annulus with the introduced cement stream.

It is, therefore, an object of this invention to provide a radioactive marker or reference point within the well borehole which is free of the disadvantages of those hereinbefore employed.

It is another object of this invention to provide a radioactive marker within the well borehole which will be relatively indestructible.

It is a still further object of this invention to provide a radioactive marker within a well borehole incapable of or free from the danger of releasing at any given time a relatively large quantity of radioactive contaminating material within the well borehole.

It is still a further object of this invention to provide a radioactive marker within a well borehole which cannot be inadvertently shifted in position and which will have a life substantially equal to that of the well.

The objects of this invention are accomplished in general by employing casing units such as casing collars or other coupling means which have been rendered radioactive in the process of manufacture by the addition of radioactive material to the molten metal. More precisely stated, the objects of this invention are accomplished by the addition of radioactive materials such as radioisotopes to the molten metal from which the casing units or joining means are fabricated whereby the finished casing units contain such radioactive material homogeneously distributed or alloyed therein.

Other objects, advantages and features of novelty of this invention will be evident hereinafter.

In the drawings which illustrate a preferred embodiment and method of operation of the invention, Figure 1 is a vertical section of a cased well borehole and diagrammatic illustration of a radioactivity well logging instrument employed in connection with the operation of the invention.

Figure 2 is a diagrammatic illustration of an enlarged radioactivity well log of the type shown in smaller scale in connection with Figure 1 and correlated with the depth of the well.

Figure 3 is a longitudinal sectional view of a pipe or casing joint formed by welding.

Figure 4 is a vertical section of a buried pipe incorporating some of the features of the invention.

Figure 5 is a cross-sectional view taken on line 5—5 of Figure 4.

Referring to Figure 1, a well borehole is illustrated at 10 in which a conventional casing string 11 has been set and cemented in place. The casing string may comprise the usual arrangement of casing lengths or stands 13 interconnected, end to end, by means of threaded casing collars 12. The annular body of the cement which may be introduced into the annular space between the casing and borehole wall by a conventional cementing process is shown at 14.

Illustrated at 15 is a survey instrument adapted to be lowered into the well casing and through any fluid present therein, such instrument containing conventional apparatus including, for example, a suitable Geiger-Müller counter or ionization chamber, capable of detecting and measuring the intensity of gamma ray radiations from the adjacent radioactive materials within and surrounding the well borehole. The instrument 15 is suspended upon the usual conductor cable 16 which extends from a reel or drum 17 located at the top of the well. A pair of insulated conductors in the conductor cable 16 make electrical connection with the said apparatus within the instrument 15. Electrical connection is completed between the pair of insulated conductors contained within the conductor cable 16 and an amplifier 18 at the top of the well borehole, through slip rings 19 and 20, brushes 21 and 21' and conductors 22 and 23. Conductors 24 and 25 interconnect the amplifier 18 with a meter 26. The movement of meter 26 carries a hand or marker device 27 bearing upon a movable chart 28. The chart 28 is adapted to be moved in the direction shown by arrow 29 between rollers 30 and 31 by means of a suitable mechanical or electrical drive as indicated at 32 interconnecting an idler pulley wheel 34 with the chart roller 31 whereby the motion and position of chart 28 relative to the meter marker 27 may have a given relationship with the motion and position of the instrument 15 within the well borehole. A typical log curve is illustrated at 33 as drawn by the meter hand 27 upon the chart 28 during operation.

In Figure 2, the log 33 is illustrated sufficiently enlarged to be correlated with the depth of the well borehole as illustrated in Figure 1.

For purposes of illustration of a typical well to which the present invention is applicable, the well borehole 10 is shown as in excess of 9,500 feet deep and penetrating a thin water sand at 40, a producing formation at 42 and a relatively thin intermediate shale body at 44. In the radioactivity well survey, by means of which the log illustrated in Figure 2, is derived, it is established by scale measurements of the log curve that the top 41 of the producing formation 42 is 38 feet, 6 inches, below the mid-section of the radioactive collar 43 as indicated by the pronounced increase in amplitude of the log curve at 35. The log also shows that the radioactive collar 43 is approximately 9,543 feet below a given reference point (not shown) at the top of the well borehole. Having established the position of the top 41 of the producing formation 42 relative to the center of the radioactive collar 43, it is no longer of primary importance that the exact depth of the collar 43 from the top of the well be established or be capable of remeasurement in event of performing well completion operations therebelow. In other words, since it is known that the top 41 of the producing sands 42 is 38 feet, 6 inches, below the center line of radioactive collar 43, it is then necessary only to run, for example, a gun perforator into the casing having a means associated with it, such for example, as that illustrated in Ennis 2,228,623 or Fearon 2,309,835, for indicating its passage through the several casing collars comprising the casing string. In conducting perforating operations, it is then necessary only to lower the gun perforator through the casing until it reaches a point at which the counting of the casing collars indicates that it has passed through the same number of casing collars as the total number indicated on the previously made radioactivity log. Then, upon reaching the lowermost reference casing collar, such as that illustrated at 43 in Figure 1, it is then necessary only to lower the gun a further distance equal to the distance separating the reference collar from the top of the producing formation, plus or minus the additional longitudinal distance between the casing collar indicator and the uppermost or lowermost perforator in the gun respectively, in order to be assured that the gun perforator is located within the casing at a point wholly opposite the producing sands 42. In the case illustrated in Figure 1, this distance between the reference collar 43 and the top 41 of the producing formation 42 is shown by way of illustration as 38 feet, 6 inches. This additional lowering and adjustment of position of the gun perforator may be performed with sufficient accuracy, whereas the measuring and remeasuring in of the gun perforator all the way from the top of the well for a distance of say, 9,581 feet, necessary to reach the top of the producing sands 41, would be subject to many obvious errors as hereinbefore mentioned. In event the producing sands are thin or it is desired to place the perforations close to the top of the producing sands, such errors may be sufficient to result in inadvertent perforation of the casing opposite the shale body 42 or possibly even opposite the water bearing formations 40. For example, an average difference in temperature of 100° F. throughout a 10,000 foot borehole will result in a difference in length of the cable or other metallic supporting means of approximately 80 inches. Such variations in temperature may occur following drilling operations, starting or stopping drilling fluid circulation, shutting in production or the like. A change in drilling fluid gravity will introduce additional errors of comparable magnitude.

It is not necessary that all of the casing collars be radioactive. It may be desirable to employ radioactive collars at given intervals throughout the depth of the well such as, for example, every fifth, tenth, or twentieth casing coupling or it may even be desirable only to have say 1 or 2 casing collars radioactive, one possibly located at relatively short depth below the top of the well and another at a relatively great depth, such as that shown at 43 in Figure 2, to be employed for reference markers for reestablishing correlating well logs possibly years after completion of the well when it may be desirable or necessary to conduct repair, reconditioning or possibly plugging back or redrilling operations.

A great advantage to be derived by such permanent radioactive marker collars as herein described is that they can be depended upon in after years to have remained in their original positions whereas reference points as heretofore employed at the well surface may be and often are destroyed by the removal of the derrick and associated equipment or by slight modification in the topography at the top of the well and the like changing conditions.

Means other than the conventional screwed couplings or collars, included within the scope of the present invention, may obviously be employed for joining the plurality of casing or pipe stands making up the well casing string.

In Figure 3, two abutting sections of casing or pipe 45 and 46 are illustrated as being joined together end to end by means of a welded joint 47. Several suitable and well known processes may be employed for this purpose such as oxyacetylene gas welding or electric welding methods. In such welding processes, the ends of the casing to be joined are usually chamfered, placed end to end and fused together as shown at 47, additional molten metal for the joint weld being supplied from a welding rod or other suitable body to which heat is applied from an oxyacetylene welding torch or by an electric arc established between the end of the welding rod and the portion of the metal to be joined. In Figure 3, the electric arc method is illustrated in which the heating arc is formed at 48 between the end of a welding rod 49 and the abutting ends of casing sections 45 and 46. Electric current for the arc may be supplied through conductors 51 and 52 from a conventional arc welding generator as illustrated at 50. Welded joints such as that illustrated at 47 may thus be employed in lieu of the usual screwed collar joints or couplings of the type illustrated at 43 in Figure 1. In order to render such welded joints detectable in the same manner as for the casing collars 43 and by means of a radioactivity measuring device such as that shown at 15 in Figure 1, the welding rod used for the welding process such as the rod illustrated at 49 in Figure 3, may be composed of a suitable metal containing a homogeneously distributed or alloyed radioactive material. Such radioactive material may be, as in the case of the casing collars, added to or alloyed with the metal melt from which the welding rods are rolled or drawn.

In Figures 4 and 5, a subterranean pipe is illustrated, the longitudinal seam of which has been made by means of welding in the same manner as that hereinbefore described in connection with the elements of Figure 3. The weld material illustrated in the seam at 59 thus may contain homogeneously distributed or alloyed radioactive material. By employing a portable instrument such as that, for example, shown and described in Deming 2,401,723, capable of detecting gamma ray radiations from such radioactive material as that employed in the formation of the weld 50, it is possible to quickly and accurately trace the course of any such welded pipe line buried in the earth or hidden in walls and the like structures. By this means, one may be enabled quickly, inexpensively and accurately to locate the position and course of similarly treated electrical power and telephone circuits, submarine cables, pipe lines, conduits and the like.

Various radioactive materials are suitable for addition to the molten metal to be employed in accordance with this invention such as, for example, the naturally radioactive compounds of radium, thorium and uranium or various ones of the artificially activated radioisotopes now obtainable. Artificially produced radioisotopes are in some cases preferable to the naturally occurring radioactive materials for the reasons that they are less expensive, usually stronger in gamma radiation for a given quantity thereof and have shorter emission lives which may be more suited to the period of time of probable use in the various embodiments hereindescribed.

One example of a suitable radioisotope is cobalt ($Co^{60}$). This isotope is a strong emitter of gamma radiation and has a suitable half life of approximately 5.3 years. It has been found that the presence of from .001 to .030 millicurie of radiation in a casing collar or casing joint will result in strong deflections of the recorders of radioactivity logging instruments of the type hereinbefore mentioned, such deflections being several times greater in amplitude than the average of the background radioactivity of the surrounding formations. This will permit the location of the collars to be distinctly indicated in subsequent surveys over a period of at least twenty-five or thirty years.

The radioactive cobalt may be added to the metal melt during its final stages of refinement prior to formation of ingots from which the collar blanks are forged and finally machined. This material may be added to the melt in the form of the compound, cobalt oxide, $Co_3O_4$, as supplied by the Isotopes Branch of the United States Atomic Energy Commission. Such material as supplied contains approximately 22 millicuries of radioactive cobalt per gram of the compound.

In general, the amount of radioactive material added to the metal should be such that, for example, in connection with well logging, the total quantity present in any casing collar or coupling is approximately the same regardless of its size. However, as is apparent from the foregoing, the usable range of quantities of the radioisotope is extremely wide, being in the order of a ratio of approximately thirty to one. Thus the range of quantities added to the melt from which the collars or welding rod is fabricated may be comparably wide. In the case of casing, tubing or pipe couplings and collars, each such unit should contain an amount of $Co^{60}$ which will result from the addition to each of approximately $4.5 \times 10^{-5}$ to approximately $1.4 \times 10^{-3}$ grams of the before mentioned radioactive compound, $Co_3O_4$. Since casing and tubing couplings and collars range in weight from about five pounds to about one hundred pounds, this compound may be added to the final metal melt in quantities ranging from approximately $9.0 \times 10^{-4}$ to .56 grams per ton, to obtain the before-specified degree of radioactivity. In the case of welding rod manufacture higher portions are desirable due to the relatively smaller quantity of metal present in a welded joint or seam. For this latter purpose, from approximately $9.0 \times 10^{-3}$ to approximately 5.6 grams per ton of metal melt is suitable.

Other radioisotopes may be employed, the choice of which is dependent upon the life, type and intensity of radiation required for the particular application or service in which the coupling or welding is to be employed.

Where the bodies to be detected and traced are non-ferrous, such as, for example, copper or brass piping, copper conductors, cables and the like, the radioisotope of zinc, $Zn^{65}$, is suitable. This material is supplied by the Atomic Energy Commission in the form of pure zinc having a radioactivity of 1.9 millicuries per gram and a half life of 250 days. Silver containing the radioisotope $Ag^{110}$ is also suitable in some instances and can be obtained from the same source in the form of the compound, silver nitrate, $AgNO_3$, having a radioactivity of 5 millicuries per gram of the compound and a half life of 225 days.

It may be desirable in some cases to reduce these radioactive compounds to the uncombined pure metals prior to addition to the metal melt. Such reduction may be accomplished by well known processes such as by reduction by hydrogen in the case of the $Co_3O_4$ and by electroplating and the like for $AgNO_3$ and the like.

While, for convenience of illustration, casing collars, couplings, welded joints and welded seams have been disclosed as composed of alloyed radioisotopes, any other suitable unit or component of a casing string, pipe line or the like may be similarly composed as desired or required for location or tracing by means sensitive to radiations from radioactive substances. Therefore, wherever herein and in the claims the terms coupling means or casing unit is employed, they are to be considered as equivalent to one another and equivalent to the term casing collar, coupling, joint or seam welded or otherwise, casing or pipe stand and the like. Also where the term welding rod is used, it is to be considered as equivalent to any other shape or body of welding material whether or not in rod form, suitable for use in the manner of a welding rod to supply metal to a weld.

It is to be understood that the foregoing is illustrative only and that the invention is not to be limited thereby but may include various modifications within the skill of the art without distinguishing from the scope of the invention as defined in the appended claim.

What is claimed is:

The method which comprises positioning in a well borehole with respect to a stratum penetrated by said borehole, a solid pipe coupling carried by a casing string positioned in said borehole, said coupling having homogeneously incorporated therein a radioactive material and maintaining said radioactive material permanently disposed in the same position in said borehole with respect to said stratum.

JAMES W. McPHEE.

REFERENCES CITED

The following references are of record in the file of this patent:

UNITED STATES PATENTS

| Number | Name | Date |
| --- | --- | --- |
| 2,315,845 | Ferris | Apr. 6, 1943 |
| 2,352,993 | Albertson | July 4, 1944 |
| 2,365,553 | Hill | Dec. 19, 1944 |